United States Patent
Cavalieri et al.

(10) Patent No.: US 12,275,837 B2
(45) Date of Patent: Apr. 15, 2025

(54) PROPYLENE BASED POLYMER COMPOSITION

(71) Applicant: BASELL POLIOLEFINE ITALIA S.R.L., Milan (IT)

(72) Inventors: Claudio Cavalieri, Ferrara (IT); Paola Massari, Ferrara (IT); Isabella Maria Vittoria Camurati, Ferrara (IT); Roberto Pantaleoni, Ferrara (IT); Gianni Collina, Ferrara (IT); Gianni Vitale, Ferrara (IT); Marco Ciarafoni, Ferrara (IT); Benedetta Gaddi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 667 days.

(21) Appl. No.: 17/617,771

(22) PCT Filed: May 26, 2020

(86) PCT No.: PCT/EP2020/064491
§ 371 (c)(1),
(2) Date: Dec. 9, 2021

(87) PCT Pub. No.: WO2020/249388
PCT Pub. Date: Dec. 17, 2020

(65) Prior Publication Data
US 2022/0235212 A1   Jul. 28, 2022

(30) Foreign Application Priority Data
Jun. 13, 2019  (EP) .................................... 19179927

(51) Int. Cl.
| | |
|---|---|
| *C08F 210/16* | (2006.01) |
| *C08J 5/18* | (2006.01) |
| *C08L 23/16* | (2006.01) |
| *C08F 2/00* | (2006.01) |
| *C08F 210/06* | (2006.01) |

(52) U.S. Cl.
CPC ............ *C08L 23/16* (2013.01); *C08F 210/16* (2013.01); *C08J 5/18* (2013.01); *C08F 2/001* (2013.01); *C08F 210/06* (2013.01); *C08L 2201/10* (2013.01); *C08L 2203/162* (2013.01); *C08L 2205/02* (2013.01)

(58) Field of Classification Search
CPC ...... C08F 210/16; C08F 210/06; C08F 2/001; C08F 2/34; C08L 2500/12; C08L 2500/27; C08L 2500/34; C08L 2500/26; C08L 23/16
See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |
| 10,501,616 B2* | 12/2019 | Galvan | C08L 23/04 |
| 10,611,901 B2* | 4/2020 | Covezzi | C08L 23/12 |
| 11,124,636 B2* | 9/2021 | Massari | C08L 23/16 |
| 11,230,638 B2* | 1/2022 | Gahleitner | C08F 210/06 |
| 11,746,224 B2* | 9/2023 | Gahleitner | C08F 2/00 |
| | | | 525/240 |
| 2017/0145199 A1 | 5/2017 | Wang et al. | |
| 2022/0017734 A1* | 1/2022 | Wang | C08J 5/18 |
| 2023/0312897 A1* | 10/2023 | Ferraro | C08L 23/16 |
| | | | 525/240 |

FOREIGN PATENT DOCUMENTS

| | | |
|---|---|---|
| CN | 103890078 A | 6/2014 |
| CN | 104159965 A | 11/2014 |
| WO | 9844009 A1 | 10/1998 |
| WO | 2006002778 A1 | 1/2006 |
| WO | 2017097579 A1 | 6/2017 |
| WO | 2018202396 A1 | 11/2018 |

OTHER PUBLICATIONS

International Search Report and Written Opinion Mailed Oct. 21, 2020 (Oct. 21, 2020) For Corresponding PCT/EP2020/064491.
Zhao et al., The Performance of Special Polypropylene Resin for Shrinkage Film with Low Seal Temperature, China Plastics Industry, vol. 45, No. 6, Jun. 2017, pp. 127-129.
Wang et al., Study of Improving Defects Biaxial Orientation Polypropylene Filim, Anhui Chemical Industry, vol. 42, No. 6, Dec. 2016, pp. 53-56.

* cited by examiner

Primary Examiner — Rip A Lee

(57) ABSTRACT

A propylene polymer composition made from or containing:
a) from 15 wt % to 35 wt % of a propylene 1-hexene copolymer containing from 6.2 to 8.5% by weight, of 1-hexene derived units and having a Melt Flow Rate from 3.5 to 8.5 g/10 min;
b) from 15 wt % to 35 wt % of a propylene 1-hexene copolymer containing from 10.4 wt % to 14.5 wt %, of 1-hexene derived units and having a Melt Flow Rate from 3.5 to 8.5 g/10 min; and
c) from 38 wt % to 68 wt % of a propylene ethylene copolymer containing from 3.4 wt % to 5.7 wt % of ethylene derived units and having a Melt Flow Rate from 3.5 to 12.0 g/10 min,
wherein the sum of the amount of a), b) and c) being 100.

15 Claims, No Drawings

PROPYLENE BASED POLYMER COMPOSITION

This application is the U.S. National Phase of PCT International Application PCT/EP2020/064491, filed May 26, 2020, claiming benefit of priority to European Patent Application No. 19179927.9, filed Jun. 13, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a composition made from or containing a copolymer of propylene with 1-hexene and a copolymer of propylene and ethylene and films made therefrom.

BACKGROUND OF THE INVENTION

In some instances, copolymers of propylene and 1-hexene have a molecular weight distribution of monomodal type and are used for pipes systems.

SUMMARY OF THE INVENTION

In a general embodiment, the present disclosure provides a propylene polymer composition made from or containing:
   a) from 15 wt % to 35 wt %, based upon the total weight of the propylene polymer composition, of a propylene 1-hexene copolymer containing from 6.2 to 8.5% by weight, based upon the weight of the propylene 1-hexene copolymer, of 1-hexene derived units and having a Melt Flow Rate (MFR, measured according to ASTM D 1238-13, 230° C./2.16 kg, that is, at 230° C., with a load of 2.16 kg) from 3.5 to 8.5 g/10 min;
   b) from 15 wt % to 35 wt %, based upon the total weight of the propylene polymer composition, of a propylene 1-hexene copolymer containing from 10.4 to 14.5% by weight, based upon the weight of the propylene 1-hexene copolymer, of 1-hexene derived units and having a Melt Flow Rate (MFR, measured according to ASTM D 1238-13, 230° C./2.16 kg, that is, at 230° C., with a load of 2.16 kg) from 3.5 to 8.5 g/10 min; and
   c) from 38 wt % to 68 wt %, based upon the total weight of the propylene polymer composition, of a propylene ethylene copolymer containing from 3.4 wt % to 5.7 wt %, based upon the weight of the propylene ethylene copolymer, of ethylene derived units and having a Melt Flow Rate (MFR, measured according to ASTM D 1238-13, 230° C./2.16 kg that is, at 230° C., with a load of 2.16 kg) from 3.5 to 12.0 g/10 min,
   wherein the sum of the amount of a), b) and c) being 100 and
   i) the total amount of 1-hexene derived units content of components a) and b) ranges from 9.4 wt % to 11.6 wt %;
   ii) the composition has a xylene soluble content at 25° C. ranging from 14.2 wt % to 19.3 wt %;
   iii) the 1-hexene derived units content of the composition ranges from 3.7 wt % to 6.4 wt %;
   iv) the composition has a melting point ranging from 128° C. to 135° C.; and
   v) component c) has a xylene soluble content at 25° C. ranging from 3.7 wt % to 7.8 wt %.

DETAILED DESCRIPTION OF THE INVENTION

In some embodiments, the present disclosure provides a propylene polymer composition made from or containing:
   a) from 15 wt % to 35 wt %; alternatively from 20 wt % to 31 wt %; alternatively from 22 wt % to 28 wt %; based upon the total weight of the propylene polymer composition, of a propylene 1-hexene copolymer containing from 6.2 wt % to 8.5 wt %; alternatively from 6.8 wt % to 8.1 wt %; alternatively from 7.1 wt % to 7.9 wt %, based upon the weight of the propylene 1-hexene copolymer, of 1-hexene derived units and having a Melt Flow Rate (MFR, measured according to ASTM D 1238-13, 230° C./2.16 kg, that is, at 230° C., with a load of 2.16 kg) from 3.5 to 8.5 g/10 min, alternatively from 4.4 to 8.0 g/10 min; alternatively from 5.0 to 7.0 8.5 g/10 min;
   b) from 15 wt % to 35 wt % alternatively from 20 wt % to 31 wt %; alternatively from 22 wt % to 28 wt %; based upon the total weight of the propylene polymer composition, of a propylene 1-hexene copolymer containing from 10.4 wt % to 14.5 wt %; alternatively from 11.2 wt % to 13.9 wt %; alternatively from 11.6 wt % to 13.3 wt %, based upon the weight of the propylene 1-hexene copolymer, of 1-hexene derived units and having a Melt Flow Rate (MFR, measured according to ASTM D 1238-13, 230° C./2.16 kg, that is, at 230° C., with a load of 2.16 kg) from 3.5 to 8.5 g/10 min, alternatively from 4.4 to 8.0 g/10 min; alternatively from 5.0 to 7.0 8.5 g/10 min; and
   c) from 38 wt % to 68 wt %; alternatively from 42 wt % to 62 wt %; alternatively from 45 wt % to 58 wt %, based upon the total weight of the propylene polymer composition, of a propylene ethylene copolymer containing from 3.4 wt % to 5.7 wt %; alternatively from 3.9 wt % to 5.1 wt %; alternatively from 4.2 wt % to 4.9 wt %, based upon the weight of the propylene ethylene copolymer, of ethylene derived units and having a Melt Flow Rate (MFR, measured according to ASTM D 1238-13, 230° C./2.16 kg, that is, at 230° C., with a load of 2.16 kg) from 3.5 to 8.5 g/10 min, alternatively from 4.4 to 8.0 g/10 min; alternatively from 5.0 to 7.0 8.5 g/10 min,
   wherein the sum of the amount of a), b) and c) being 100 and
   i) the total amount of 1-hexene derived units content of components a) and b) ranges from 9.4 wt % to 11.6 wt %; alternatively from 9.5 wt % to 11.5 wt %; alternatively from 9.6 wt % to 10.8 wt %;
   ii) the xylene soluble content at 25° C. of the composition ranges from 14.2 wt % to 19.3 wt %; alternatively from 15.3 wt % to 18.7 wt %; alternatively from 16.2 wt % to 18.1 wt %;
   iii) the 1-hexene derived units content of the composition ranges from 3.7 wt % to 6.4 wt %; alternatively from 3.9 wt % to 5.4 wt %; alternatively from 4.2 wt % to 5.2 wt %;
   iv) the melting point of the composition ranges from 128° C. to 135° C.; alternatively from 129° C. to 133° C.; and
   v) the xylene soluble content at 25° C. of component c) ranges from 3.7 wt % to 7.8 wt %; alternatively from 4.1 wt % to 6.8 wt %, alternatively from 4.6 wt % to 6.2 wt %.

In some embodiments, the propylene 1-hexene copolymer contains propylene and 1-hexene derived units. In some embodiments, the propylene ethylene copolymer contains propylene and ethylene derived units.

In some embodiments, the propylene polymer composition is used for the production of film, alternatively cast or biaxially oriented polypropylene films (BOPP) films.

In some embodiments, the Seal Initiating Temperature (SIT) value is between 70° C. and 85° C.; alternatively between 72° C. and 80° C. In some embodiments, the difference between the melting point and the SIT (Tm-SIT) ranges from 45° C. to 65° C.; alternatively from 50° C. to 62° C.

In some embodiments, the composition has a crystallization temperature measured by DSC higher than 82.0° C.; alternatively higher than 83.0° C. In some embodiments, the crystallization temperature is lower than 100.0° C.

In some embodiments, components a)+b) of the composition have a 1-hexene derived units content in the fraction soluble in xylene at 25° C. between 18.0 wt % and 32.0 wt %; alternatively from 21.0 wt % and 30.0 wt %.

In some embodiments, component c) has an ethylene derived units content in the fraction soluble in xylene at 25° C. between 10.0 wt % and 17.0 wt %; alternatively between 11.0 wt % and 16.0 wt %; alternatively between 13.0 wt % and 15.0 wt %.

In some embodiments, components a), b), and c) of the propylene polymer composition are obtained with polymerization processes carried out in the presence of a catalyst made from or containing the product of a reaction between:

a solid catalyst component made from or containing Ti, Mg, Cl, and at least one electron donor compound containing from 0.1 to 50% wt of Bi with respect to the total weight of the solid catalyst component;

(ii) an alkylaluminum compound; and (iii) an external electron-donor compound having the formula:

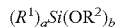

wherein $R^1$ and $R^2$ are independently selected among alkyl or cycloalkyl radicals with 1-8 carbon atoms and a+b=4.

In some embodiments, the external donor is an ester of glutaric acid, alternatively an alkyl ester of glutaric acid; alternatively the ester of glutaric acid is used in a mixture with 9,9-bis(alkoxymethyl)fluorene. In some embodiments, the molar ratio between esters of glutaric acid and 9,9-bis(alkoxymethyl)fluorene is from 50:50 to 90:10; alternatively from 60:40 to 80:20; alternatively from 65:35 to 75:25. In some embodiments, the alkyl radical is a $C_1$-$C_{10}$ alkyl radical. In some embodiments, the $C_1$-$C_{10}$ alkyl radical is selected from the group consisting of a methyl, ethyl propyl; butyl radicals. In some embodiments, the alkyl ester of glutaric acid is 1 3,3-dipropylglutarate. In some embodiments, the 9,9-bis(alkoxymethyl)fluorene is 9,9-bis(methoxymethyl)fluorene.

In some embodiments and in the catalyst component, the content of Bi ranges from 0.5 to 40% wt, alternatively from 1 to 35% wt, alternatively from 2 to 25% wt, alternatively, from 2 to 20% wt, based upon the total weight of the solid catalyst component.

In some embodiments, the particles of the solid component have substantially spherical morphology and an average diameter ranging between 5 and 150 µm, alternatively from 20 to 100 µm, alternatively from 30 to 90 µm. As used herein, the term "substantially spherical morphology" refers to particles having the ratio between the greater axis and the smaller axis equal to or lower than 1.5, alternatively lower than 1.3.

In some embodiments, the amount of Mg ranges from 8 to 30% wt, alternatively from 10 to 25% wt, based upon the total weight of the solid catalyst component.

In some embodiments, the amount of Ti ranges from 0.5 to 5% wt, alternatively from 0.7 to 3% wt, based upon the total weight of the solid catalyst component.

In some embodiments, the Mg/Ti molar ratio is equal to, or higher than, 13, alternatively in the range of 14 to 40, alternatively from 15 to 40. In some embodiments, the Mg/donor molar ratio is higher than 16, alternatively higher than 17, alternatively ranging from 18 to 50.

In some embodiments, Bi atoms are derived from one or more Bi compounds not having Bi-carbon bonds. In some embodiments, the Bi compounds are selected from the group consisting of Bi halides, Bi carbonate, Bi acetate, Bi nitrate, Bi oxide, Bi sulfate, and Bi sulfide. In some embodiments, the Bi compounds have the valence state of $3^+$. In some embodiments, the Bi compounds are selected from the group consisting of Bi trichloride and Bi tribromide. In some embodiments, the Bi compound is $BiCl_3$.

In some embodiments, the solid catalyst component is prepared by reacting a titanium compound of the formula $Ti(OR)_{q-y}X_y$, where q is the valence of titanium and y is a number between 1 and q, with a magnesium chloride deriving from an adduct of formula $MgCl_2 \cdot pROH$, where p is a number between 0.1 and 6, alternatively from 2 to 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride, operating under stirring conditions at the melting temperature of the adduct (100-130° C.). Then, the adduct is mixed with an inert hydrocarbon immiscible with the adduct, thereby creating an emulsion which is quickly quenched, causing the solidification of the adduct in form of spherical particles. In some embodiments, the procedure for the preparation of the spherical adducts is as disclosed in U.S. Pat. Nos. 4,399,054 and 4,469,648. In some embodiments, the resulting adduct is directly reacted with a Ti compound or subjected to thermally controlled dealcoholation (80-130° C.), thereby obtaining an adduct wherein the number of moles of alcohol is lower than 3, alternatively between 0.1 and 2.5. In some embodiments, the reaction with the Ti compound is carried out by suspending the adduct (dealcoholated or not) in cold $TiCl_4$; the mixture is heated up to 80-130° C. and kept at this temperature for 0.5-2 hours. In some embodiments, the temperature of the cold $TiCl_4$ is 0° C. In some embodiments, the treatment with $TiCl_4$ is carried out one or more times. In some embodiments, the electron donor compound is added during the treatment with $TiCl_4$.

Several ways are available to add one or more Bi compounds in the catalyst preparation. In some embodiments, the Bi compound(s) is/are incorporated directly into the $MgCl_2 \cdot pROH$ adduct during the adduct's preparation. In some embodiments, the Bi compound is added at the initial stage of adduct preparation by mixing the Bi compound together with $MgCl_2$ and the alcohol. In some embodiments, the Bi compound is added to the molten adduct before the emulsification step. The amount of Bi introduced ranges from 0.1 to 1 mole per mole of Mg in the adduct. In some embodiments, the Bi compound(s), which are incorporated directly into the $MgCl_2 \cdot pROH$ adduct, are Bi halides, alternatively $BiCl_3$.

In some embodiments, the alkyl-Al compound (ii) is selected from the group consisting of trialkyl aluminum compounds, alkylaluminum halides, alkylaluminum hydrides and alkylaluminum sesquichlorides. In some embodiments, the alkyl-Al compound (ii) is a trialkyl aluminum compound selected from the group consisting of triethylaluminum, triisobutylaluminum, tri-n-butylaluminum, tri-n-hexylaluminum, and tri-n-octylaluminum. In some embodiments, the alkyl-Al compound (ii) is an alkylaluminum sesquichlorides selected from the group consisting of AlEt$_2$Cl and Al$_2$Et$_3$Cl$_3$. In some embodiments, the alkyl-Al compound (ii) is a mixture including trialkylaluminums. In some embodiments, the Al/Ti ratio is higher than 1, alternatively between 50 and 2000.

The external electron donor compound (iii) is a silicon compound having the formula:

$$(R^1)_a Si(OR^2)_b \quad \text{(II)}$$

wherein $R^1$ and $R^2$ are independently selected among alkyl or cycloalkyl radicals with 1-8 carbon atoms, optionally containing heteroatoms, wherein a+b=4.

In some embodiments, the silicon compounds of formula II are selected from the group consisting of (tert-butyl)$_2$Si(OCH$_3$)$_2$, (cyclopentyl)$_2$Si(OCH$_3$)$_2$, and (cyclohexyl)(methyl)Si(OCH$_3$)$_2$.

In some embodiments, the external electron donor compound (iii) is used in an amount to give a molar ratio between the alkylaluminum compound (ii) and the external electron donor compound (iii) of from 0.1 to 200, alternatively from 1 to 100, alternatively from 3 to 50.

In some embodiments, the polymerization process is continuous or batch. In some embodiments, the polymerization process is operated in gas phase, in liquid phase, or by mixed liquid-gas techniques. In some embodiments, the liquid phase is operated in the presence of an inert diluent. In some embodiments, the liquid phase is operated in the absence of an inert diluent. In some embodiments, the polymerization is carried out in gas phase in three reactors, with a reactor for each component of the composition. In some embodiments and in the first two reactors, components a) and b) respectively are obtained while component c) is obtained in the third and last reactor.

In some embodiments, the polymerization temperature is from 20 to 100° C. In some embodiments, the polymerization pressure is atmospheric or higher.

In some embodiments, the molecular weight is regulated. In some embodiments, the molecular weight regulator is hydrogen.

In some embodiments, the composition contains additives. In some embodiments, the additives are selected from the group consisting of nucleating agents, clarifying agents and processing aids.

In some embodiments, the composition has a number of gels No(>0.1 mm) of less than 250; alternatively less than 150.

In some embodiments, the propylene polymer composition is used for the production of films. In some embodiments, cast or BOPP film mono or multilayer have at least one layer made from or containing the composition.

EXAMPLES

The following examples are given for illustration without limiting purpose.

The data relating to the polymeric materials and the films of the examples are determined by the methods reported below.

Melting and Crystallization Temperature (ISO 11357-2013)

Determined by differential scanning calorimetry (DSC).according to ISO 11357-20133, at scanning rate of 20° C./min both in cooling and heating, on a sample of weight between 5 and 7 mg, under inert N2 flow. The instrument was calibrated with Indium.

Melt Flow Rate (MFR)

Determined according to ASTM D 1238-13, at 230° C., with a load of 2.16 kg.

Solubility in xylene at 25° C.

Xylene Solubles was measured according to ISO 16 152-2005; with solution volume of 250 ml, precipitation at 25° C. for 20 minutes, including 10 minutes with the solution in agitation (magnetic stirrer), and drying at 70°

Intrinsic viscosity (IV)

Determined in tetrahydronaphthalene at 135° C.

$^{13}$C NMR of propylene/ethylene copolymers $^{13}$C NMR spectra were acquired on a Bruker AV-600 spectrometer equipped with cryoprobe, operating at 160.91 MHz in the Fourier transform mode at 120° C.

The peak of the S$_{\beta\beta}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as internal reference at 29.9 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$$PPP=100\ T_{\beta\beta}/S \quad PPE=100\ T_{\beta\delta}/S \quad EPE=100\ T_{\delta\delta}/S$$

$$PEP=100\ S_{\beta\beta}/S \quad PEE=100\ S_{\beta\delta}/S \quad EEE=100(0.25\ S_{\gamma\delta}+0.5\ S_{\delta\delta})/S$$

$$S=T_{\beta\beta}+T_{\beta\delta}+T_{\delta\delta}+S_{\beta\beta}+S_{\beta\delta}+0.25\ S_{\gamma\delta}+0.5\ S_{\delta\delta}$$

The molar percentage of ethylene content was evaluated using the following equation:

$$E\%\ mol=100*[PEP+PEE+EEE]$$

The weight percentage of ethylene content was evaluated using the following equation:

$$E\%\ wt. = \frac{*E\%\ \text{mol} * MW_E}{E\%\ \text{mol} * MW_E + P\%\ \text{mol} * MW_P}$$

where P % mol is the molar percentage of propylene content, while MW$_E$ and MW$_P$ are the molecular weights of ethylene and propylene, respectively.

The product of reactivity ratio $r_1r_2$ was calculated according to Carman (C. J. Carman, R. A. Harrington and C. E. Wilkes, Macromolecules, 1977; 10, 536) as:

$$r_1r_2 = 1+\left(\frac{EEE+PEE}{PEP}+1\right)-\left(\frac{P}{E}+1\right)\left(\frac{EEE+PEE}{PEP}+1\right)^{0.5}$$

The tacticity of Propylene sequences was calculated as mm content from the ratio of the PPP mmT$_{\beta\beta}$ (28.90-29.65 ppm) and the whole T$_{\beta\beta}$ (29.80-28.37 ppm).

1-hexene and ethylene content:

Determined by $^{13}$C-NMR spectroscopy in terpolymers:

NMR analysis. $^{13}$C NMR spectra were acquired on an AV-600 spectrometer operating at 150.91 MHz in the Fourier transform mode at 120° C. The peak of the propylene CH was used as internal reference at 28.83. The $^{13}$C NMR spectrum was acquired using the following parameters:

| | |
|---|---|
| Spectral width (SW) | 60 ppm |
| Spectrum center (O1) | 30 ppm |
| Decoupling sequence | WALTZ 65_64pl |
| Pulse program [1] | ZGPG |
| Pulse Length (P1) [2] | for 90° |
| Total number of points (TD) | 32 K |
| Relaxation Delay [2] | 15 s |
| Number of transients [3] | 1500 |

The total amount of 1-hexene and ethylene as molar percent was calculated from diad using the following relations:

$[P]=PP+0.5PH+0.5PE$ $[H]=HH+0.5PH$ $[E]=EE+0.5PE$

Assignments of the $^{13}$C NMR spectrum of propylene/1-hexene/ethylene copolymers were calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma} + S_{\alpha\delta}$ | PE |
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

The 1-hexene content of component b was calculated from the 1-hexene total content of the composition by using the formula $C6_{tot}=C6_{ax}W_a+C6_{bx}W_b$, wherein $C_6$ was the 1-hexene content and $W_a$ and $W_b$ were the amount of components a and b.

Seal Initiation Temperature (SIT)

Preparation of the Film Specimens

Some films with a thickness of 50 μm were prepared by extruding each test composition in a single screw Collin extruder (length/diameter ratio of screw 1:25) at a film drawing speed of 7 m/min and a melt temperature of 210-250° C. Each resulting film was superimposed on a 1000 μm thick film of a propylene homopolymer having a xylene insoluble fraction of 97 wt % and an MFR L of 2 g/10 min. The superimposed films were bonded to each other in a Carver press at 200° C. under a 9000 kg load, which was maintained for 5 minutes. The resulting laminates were stretched longitudinally and transversally, that is, biaxially, by a factor of 6 with a Karo 4 Brueckener film stretcher at 160° C., thereby obtaining a 20 μm thick film (18 μm homopolymer+2 μm test).

Determination of the SIT.

Film Strips, 6 cm wide and 35 cm length were cut from the center of the BOPP film. The film was superimposed with a BOPP film made of PP homopolymer. The superimposed specimens were sealed along one of the 2 cm sides with a Brugger Feinmechanik Sealer, model HSG-ETK 745. Sealing time was 5 seconds at a pressure of 0.14 MPa (20 psi). The starting sealing temperature was from about 10° C. less than the melting temperature of the test composition. The sealed strip was cut into 6 specimens 15 mm wide long enough to be held in the tensile tester grips. The seal strength was tested at a load cell capacity 100 N, cross speed 100 mm/min and grip distance 50 mm. The results were expressed as the average of maximum seal strength (N). The unsealed ends were attached to an Instron machine wherein the sample specimens were tested at a traction speed of 50 mm/min.

The test was repeated by changing the temperature as follows:

If seal strength <1.5 N, then increase the temperature

If seal strength >1.5 N, then decrease the temperature

Temperature variation was adjusted stepwise. If seal strength was close to target, steps of 1° C. were selected. If the strength was far from target, steps of 2° C. were selected.

The target seal strength (SIT) was defined as the lowest temperature at which a seal strength higher or equal to 1.5 N was achieved.

Number of Gels (Fisheye Count)

The determination of the number of gels per m$^2$ was carried out by visually detecting the number of gels of a sample film projected by a projector on a white wall-chart with a magnified scale. Film pieces of 130×7.5 cm were cut from a cast film at least 30 minutes after extrusion (die temperature in the range from 250° to 290° C., chill rolls temperature 20° C.).

The counting was made on 5 different pieces of the same film. A final number was given by the expression No=A/S where No is the number of gels per m$^2$, A is the number of gels counted on 5 film pieces and S is the overall surface in m$^2$ of the 5 films pieces examined. Gels of irregular shape were measured at the point of maximum extension.

Preparation of the Copolymer

Catalyst System

Procedure for the Preparation of the Spherical Adduct

Microspheroidal $MgCl_2 \cdot pC_2H_5OH$ adduct was prepared according to the method described in Comparative Example 5 of Patent Cooperation Treaty Publication No. WO98/44009, with the difference that $BiCl_3$ in a powder form and in an amount of 3 mol % with respect to the magnesium was added before feeding the oil.

Procedure for the Preparation of the Solid Catalyst Component

Into a 500 ml round bottom flask, equipped with a mechanical stirrer, a cooler and a thermometer, 300 ml of $TiCl_4$ were introduced at room temperature under a nitrogen atmosphere. After cooling to 0° C., 9.0 g of the spherical adduct were added while stirring. Then, diethyl 3,3-dipropylglutarate was sequentially added into the flask. The amount of charged internal donor was to meet a Mg/donor molar ratio of 13. The temperature was raised to 100° C. and maintained for 2 hours. Thereafter, stirring was stopped, the solid product was allowed to settle, and the supernatant liquid was siphoned off at 100° C.

After siphoning, fresh $TiCl_4$ and an amount of 9,9-bis (methoxymethyl)fluorene for producing a Mg/diether molar ratio of 13 were added. The mixture was then heated at 120° C. and kept at this temperature for 1 hour under stirring. Stirring was stopped again. The solid was allowed to settle. The supernatant liquid was siphoned off. The solid was washed with anhydrous hexane six times in a temperature gradient down to 60° C. and one time at room temperature. The solid was then dried under vacuum and analyzed.

Catalyst System and Prepolymerization Treatment

Before introducing the solid catalyst component into the polymerization reactor, the solid catalyst component was contacted at 15° C. for about 6 minutes with aluminum triethyl (TEAL) and dicyclopentyl dimethoxy silane (DCPMS) as external donor.

The catalyst system was then subjected to prepolymerization by maintaining the catalyst system in suspension in liquid propylene at 20° C. for about 20 minutes before introducing the catalyst system into the polymerization reactor.

Polymerization

Into a first gas phase polymerization reactor, a propylene 1-hexene copolymer (component (a)) was produced by feeding, in a continuous and constant flow, the prepolymerized catalyst system, hydrogen (used as molecular weight regulator), propylene and 1-hexene in the gas state. The polypropylene copolymer produced in the first reactor was discharged in a continuous flow and was introduced, in a continuous flow, into a second gas phase polymerization reactor, together with quantitatively constant flows of hydrogen, 1-hexene and propylene in the gas state.

The polypropylene copolymer produced in the second reactor was discharged in a continuous flow and, after having been purged of unreacted monomers, was introduced, in a continuous flow, into a third gas phase polymerization reactor, together with quantitatively constant flows of hydrogen, 1-hexene and propylene in the gas state.

The polymerization conditions are reported in Table 1.

TABLE 1

|  |  | Ex 1 |
| --- | --- | --- |
| catalyst feed | g/h | 14.3 |
| TEAL/solid catalyst component weight ratio | g/g | 4 |
| TEAL/D donor weight ratio | g/g | 10 |
| Prepolymerization |  |  |
| temperature |  | 20 |
| Residence time |  | 34 |
| First gas phase reactor |  |  |
| Polymerization temperature | ° C. | 75 |
| MFR | g/10 min | 5.4 |
| Pressure | barg | 15 |
| $H_2/C_3$ | mol/mol | 0.0035 |
| $C_6/C_6 + C_3$ | mol/mol | 0.135 |
| split first reactor (amount A) | wt % | 24 |
| Second gas phase reactor |  |  |
| Polymerization temperature | ° C. | 75 |
| Pressure | barg | 15 |
| MFR* | g/10 min | 6.1 |
| $H_2/C_3$ | mol/mol | 0.035 |
| $C_6/C_6 + C_3$ | mol/mol | 0.194 |
| split second reactor (amount B) | wt % | 26 |
| Third gas phase reactor |  |  |
| Polymerization temperature | ° C. | 65 |
| Pressure | barg | 14 |
| MFR* | g/10 min | 6.2 |

TABLE 1-continued

|  |  | Ex 1 |
| --- | --- | --- |
| $H_2/C_3$ | mol/mol | 0.051 |
| $C_2/C_2 + C_3$ | mol/mol | 0.032 |
| split third reactor (amount C) | wt % | 50 |

$C_3$ = propylene;
$C_6$ = 1-hexene;
$C_2$ ethylene;
$H_2$ = hydrogen

The polymer of Table 1 was prepared with 0.05% Irg.1010; 0.1% Irg.168 and 0.05% CaSt and then pelletized. The properties of the compositions are reported in Table 2.

TABLE 2

|  |  | Ex1 | Comp Ex2 | Comp Ex 3 |
| --- | --- | --- | --- | --- |
| component a) |  |  |  |  |
| MFR | g/10' | 5.4 | 4.2** | 4.4 |
| split | wt % | 24 | 54 | 60 |
| $C_6$-content | wt % | 7.3 | 10.9 | 7.4 |
| Xylene soluble 25° C. | Wt % | 18.1 | 35.9* | 18.0 |
| component b) |  |  |  |  |
| MFR | gr/10' | 6.8** | — | — |
| $C_6$ content | wt % | 12.2* | — | — |
| split |  | 26 | — | — |
| Xylene soluble 25° C. (a + b) | Wt % | 28.1 | — | — |
| $C_6$ Xs fraction | Wt % | 25.4 | — | — |
| component c) |  |  |  |  |
| MFR | gr/10' | 5.5** | 5.4 | 7.8 |
| $C_2$ content | Wt % | 4.7* | 5.0 | 4.6 |
| Xylene soluble 25° C. | Wt % | 6.0 | 9.6 | 7.0 |
| $C_2$ Xs fraction | Wt % | 15 | — | — |
| composition |  |  |  |  |
| MFR tot | g/10' | 5.8 | 4.7 | 5.5** |
| Xylene Soluble 25° C. | wt % | 17.1 | 23.8 | 13.1 |
| Tm | ° C. | 131.3 | 130.3 | 134.4 |
| Tc | ° C. | 85.9 | 81.9 | — |
| $C_6$ tot | wt % | 4.9 |  |  |
| SIT on BOPP film (RDM) | ° C. | 75 | 75 | 98 |
| Tm-sit | ° C. | 56.3 | 55.3 | 36.4 |
| Tm-Tc | ° C. | 45.4 | 48.4 | — |
| Gels ≥ 0.1 mm | nr/m² | 100 | 760 | — |

$C_3$ = propylene;
$C_6$ = 1-hexene;
$C_2$ ethylene;
*calculated by using the formula logMFRtot = XalogMFRa + XblogMFRb;
**calculated by using the formula Ytot = XaYa + XbYb wherein Y is the comonomer content and Xa and Xb are the splits (Xa + Xb = 1).

Comparative Example 2 was prepared as described for Example 4 of Patent Cooperation Treaty Publication No. WO 2018/202396.

Comparative Example 3 was prepared as described for Example 4 of Patent Cooperation Treaty Publication No. WO 2017/097579.

What is claimed is:

1. A propylene polymer composition comprising:
   a) from 15 wt. % to 35 wt. %, based upon a total weight of the propylene polymer composition, of a propylene 1-hexene copolymer containing from 6.2 to 8.5% by weight, based upon a total weight of the propylene 1-hexene copolymer, of 1-hexene derived units and having a melt flow rate (MFR, measured according to ASTM D 1238-13, 230° C./2.16 kg, from 3.5 to 8.5 g/10 min;

b) from 15 wt. % to 35 wt. %, based upon the total weight of the propylene polymer composition, of a propylene 1-hexene copolymer containing from 10.4 wt. % to 14.5 wt. %, based upon a total weight of the propylene 1-hexene copolymer, of 1-hexene derived units and having a Melt Flow Rate melt flow rate (MFR, measured according to ASTM D 1238-13, 230° C./2.16 kg from 3.5 to 8.5 g/10 min; and c) from 38 wt. % to 68 wt. %, based upon the total weight of the propylene polymer composition, of a propylene ethylene copolymer containing from 3.4 wt. % to 5.7 wt. %, based upon a total weight of the propylene ethylene copolymer, of ethylene derived units and having a melt flow rate (MFR, measured according to ASTM D 1238-13, 230° C./2.16 kg from 3.5 to 12.0 g/10 min, wherein a sum of an amount of a), b) and c) is 100; and i) a total amount of 1-hexene derived units of components a) and b) ranges from 9.4 wt. % to 11.6 wt. %;

ii) the propylene polymer composition has a xylene soluble content at 25° C. ranging from 14.2 wt. % to 19.3 wt. %;

iii) the 1-hexene derived units content of the propylene polymer composition ranges from 3.7 wt. % to 6.4 wt. %;

iv) the propylene polymer composition has a melting point ranging from 128° C. to 135° C., measured by DSC; and v) component c) has a xylene soluble content at 25° C. ranging from 3.7 wt. % to 7.8 wt. %.

2. The propylene polymer composition according to claim 1, wherein component a) ranges from 20 wt. % to 31 wt. %; component b) ranges from 20 wt. % to 31 wt. %; and component c) ranges from 42 wt. % to 62 wt. %.

3. The propylene polymer composition according to claim 2, wherein component a) ranges from 22 wt. % to 28 wt. %; component b) ranges from 22 wt. % to 28 wt. %; and component c) ranges from 45 wt. % to 58 wt. %.

4. The propylene polymer composition according to claim 1, wherein component a) contains from 6.8 wt. % to 8.1 wt. % of 1-hexene derived units.

5. The propylene polymer composition according to claim 1, wherein component b) contains from 11.2 wt. % to 13.9 wt. % of 1-hexene derived units.

6. The propylene polymer composition according to claim 1, wherein component c) contains from 3.9 wt. % to 5.1 wt. % of ethylene derived units.

7. The propylene polymer composition according to claim 1, wherein components a)+b) have a 1-hexene derived units content in a fraction soluble in xylene at 25° C. between 18.0 wt. % and 32.0 wt. %.

8. The propylene polymer composition according to claim 1, wherein a xylene soluble content at 25° C. of the propylene polymer composition ranges from 15.3 wt. % to 18.7 wt. %.

9. The propylene polymer composition according to claim 1, wherein the 1-hexene derived units content of the propylene polymer composition ranges from 3.9 wt. % to 5.4 wt. %.

10. The propylene polymer composition according to claim 1, wherein the melting point of the propylene polymer composition ranges from 129° C. to 133° C.

11. The propylene polymer composition according to claim 1, wherein the xylene soluble content at 25° C. of component c) ranges from 4.1 wt. % to 6.8 wt. %.

12. The propylene polymer composition according to claim 1, wherein component c) has ethylene derived units content in a fraction soluble in xylene at 25° C. comprised between 10.0 wt. % and 17.0 wt. %.

13. A film comprising the propylene polymer composition according to claim 1.

14. The film of claim 13, wherein the film is a cast film.

15. The film of claim 13, wherein the film is a BOPP film.

* * * * *